US009616425B2

(12) United States Patent
Zhou et al.

(10) Patent No.: US 9,616,425 B2
(45) Date of Patent: Apr. 11, 2017

(54) PAPER-BASED CHEMICAL ASSAY DEVICES WITH IMPROVED FLUIDIC STRUCTURES

(71) Applicant: Xerox Corporation, Norwalk, CT (US)

(72) Inventors: Jing Zhou, Pittsford, NY (US); Mandakini Kanungo, Penfield, NY (US); Nancy Y. Jia, Webster, NY (US); Wei Hong, Amherst, MA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/098,794

(22) Filed: Apr. 14, 2016

(65) Prior Publication Data

US 2016/0220999 A1 Aug. 4, 2016

Related U.S. Application Data

(63) Continuation of application No. 14/312,128, filed on Jun. 23, 2014.

(51) Int. Cl.
*G01N 31/22* (2006.01)
*B01L 3/00* (2006.01)

(52) U.S. Cl.
CPC ....... *B01L 3/502746* (2013.01); *B01L 3/5023* (2013.01); *B01L 3/502707* (2013.01); *B01L 2200/12* (2013.01); *B01L 2300/0681* (2013.01); *B01L 2300/0887* (2013.01); *B01L 2300/12* (2013.01); *B01L 2300/126* (2013.01); *B01L 2300/161* (2013.01); *B01L 2300/165* (2013.01);
(Continued)

(58) Field of Classification Search
CPC ............. B01L 3/5023; B01L 3/502707; B01L 2300/126; B01L 2300/161; B01L 2400/0688; B01L 3/502746; B01L 2200/12; B01L 2300/0681; B01L 2300/0887; B01L 2300/12; B01L 2400/086; B01L 2300/165
See application file for complete search history.

(56) References Cited

U.S. PATENT DOCUMENTS 4,606,264 A 8/1986 Agronin et al.
7,267,938 B2 9/2007 Anderson et al.
(Continued)

FOREIGN PATENT DOCUMENTS

WO WO 2008049083 A2 * 4/2008 ........... G01N 33/558

OTHER PUBLICATIONS

F. Chollet, Editor; Su-8: Thick Photo-Resist for MEMS; MEMScyclopedia; Dec. 3, 2013; 21 Pages; http://memscyclopedia.org/su8.html.

(Continued)

*Primary Examiner* — Dennis M White
(74) *Attorney, Agent, or Firm* — Maginot, Moore & Beck LLP

(57) ABSTRACT

A chemical assay device includes a hydrophilic substrate and one or more hydrophobic structures that extend from a first side of the hydrophilic substrate to a second side of the hydrophilic substrate. A hydrophobic structure in the hydrophilic substrate forms a fluid barrier wall that extends from the first side of the hydrophilic substrate to the second side of the hydrophilic substrate with a deviation of less than 20° from a perpendicular axis between the first side and the second side. The hydrophobic material in the first hydrophobic structure occupies more than 50% of a void volume fraction of the hydrophilic substrate.

12 Claims, 10 Drawing Sheets

(52) U.S. Cl.
CPC . *B01L 2400/0688* (2013.01); *B01L 2400/086* (2013.01)

(56) References Cited

U.S. PATENT DOCUMENTS

| | | | |
|---|---|---|---|
| 8,377,710 B2 | 2/2013 | Whitesides et al. | |
| 8,574,924 B2 | 11/2013 | Sia et al. | |
| 8,603,832 B2 | 12/2013 | Whitesides et al. | |
| 2010/0145491 A1 | 6/2010 | Troian | |
| 2011/0111517 A1 | 5/2011 | Siegel et al. | |
| 2011/0123398 A1* | 5/2011 | Carrilho | B01L 3/5023 422/68.1 |
| 2012/0198684 A1 | 8/2012 | Carrilho et al. | |
| 2012/0328905 A1 | 12/2012 | Guo et al. | |
| 2013/0034869 A1 | 2/2013 | Whitesides et al. | |

OTHER PUBLICATIONS

Martinez et al.; Diagnostics for the Developing World: Microfluidic Paper-Based Analytical Devices; Analytical chemistry; Jan. 1, 2010; pp. 3-10; vol. 82, Issue 1.

Bracher et al.; Patterned paper as a template for the delivery of reactants in the fabrication of planar materials; The Royal Society of Chemistry; Jun. 2010; pp. 4303-4309; www.rsc.org/softmatter.

MicroChemicals GmbH, "LithographyTrouble Shooter," 2012, Available At: http://www.microchemicals.com/technical_information/TroubleShooter_EN.pdf.

* cited by examiner

PAPER-BASED CHEMICAL ASSAY DEVICES WITH IMPROVED FLUIDIC STRUCTURES

CLAIM OF PRIORITY

This application is a continuation of and claims priority to copending U.S. application Ser. No. 14/312,128, which is entitled "Paper-Based Chemical Assay Devices With Improved Fluidic Structures," and was filed on Jun. 23, 2014.

TECHNICAL FIELD

This disclosure relates generally to chemical assay devices and, more particularly to chemical assay devices that are formed from hydrophilic substrates with embedded hydrophobic structures that control fluid flow through the hydrophilic substrates.

BACKGROUND

Paper-based chemical assay devices include portable biomedical devices, chemical sensors, diagnostic devices, and other chemical testing devices made of a hydrophilic substrate, such as paper, hydrophobic materials, such as wax or phase-change ink, and one or more chemical reagents that can detect chemical assays in test fluids. A common example of such devices includes biochemical testing devices that test fluids such as blood, urine and saliva. The devices are small, lightweight and low cost and have potential applications as diagnostic devices in healthcare, military and homeland security to mention a few. To control the flow of liquids through a porous substrate such as paper, the devices include barriers formed from wax, phase-change ink, or another suitable hydrophobic material that penetrates the paper to form fluid channels and other structures that guide the fluid to one or more sites that contain reagents in the chemical assay device.

The current state of the art paper chemical assay devices is limited on fluidic feature resolution and manufacturing compatibility due to uncontrolled reflow of the wax channel after the wax is printed on the paper. The paper and wax are placed in a reflow oven where the wax melts and penetrates into the paper. FIG. 12A and FIG. 12B depict a prior art reflow oven and the spread of melted wax during production of a prior art device. The melted wax, however, tends to spread through the paper in a uniform manner not only through the thickness of the paper but laterally along the surface direction of the paper, which cannot prevent the diffusion of the fluid in the lateral direction, hence difficult to form fine lines, features and other structures. Additionally, while the paper based chemical assay devices are designed to be low-cost devices, the existing manufacturing processes that require separate ovens and adhesives to form multi-layer devices decrease the efficiency of manufacturing these devices and increase the potential for contamination and material compatibility issues. Consequently, improvements to hydrophobic structures within porous substrates and construction of multi-layered chemical assay devices would be beneficial.

SUMMARY

In one embodiment, a chemical assay device has been developed. The chemical assay device includes a first hydrophilic substrate, the first hydrophilic substrate having a first side and a second side, a predetermined length and width, and a thickness of not more than 1 millimeter, and a first hydrophobic structure formed in the first hydrophilic substrate from a hydrophobic material and penetrating through substantially the thickness of the first hydrophilic substrate from the first side to the second side, the first hydrophobic structure forming a fluid barrier wall in the first hydrophilic substrate with a surface of the fluid barrier wall extending through the thickness of the first hydrophilic substrate with a deviation from perpendicular of less than 20° from the first side and second side of the first hydrophilic substrate.

In another embodiment, a chemical assay device has been developed. The chemical assay device includes a first hydrophilic substrate having a first side and a second side, a predetermined length and width, and a thickness of not more than 1 millimeter, and a plurality of hydrophobic structures formed in the first hydrophilic substrate from a hydrophobic material, each hydrophobic structure in the plurality of hydrophobic structures including the hydrophobic material extending from one arrangement in a plurality of arrangements of the hydrophobic material through substantially the thickness of the first hydrophilic substrate from the first side to the second side, each arrangement of the hydrophobic material being formed on only the first side of the first hydrophilic substrate prior to penetration of the hydrophobic material into the first hydrophilic substrate with a single shape and size, and a ratio of a maximum area for a largest hydrophobic structure in the plurality of hydrophobic structures to a minimum area for a smallest hydrophobic structure in the plurality of hydrophobic structures being less than 1.25.

In another embodiment, a chemical assay device has been developed. The chemical assay device includes a first hydrophilic substrate, the first hydrophilic substrate having a first side and a second side, a predetermined length and width, and a thickness of not more than 1 millimeter and a first hydrophobic structure formed in the first hydrophilic substrate from a hydrophobic material that penetrates through substantially the thickness of the first hydrophilic substrate from the first side to the second side. The hydrophobic material in the first hydrophobic structure occupies more than 50% of a predetermined void volume fraction of the hydrophilic substrate and the first hydrophobic structure to form a fluid barrier wall in the first hydrophilic substrate with a surface of the fluid barrier wall extending through the thickness of the first hydrophilic substrate with a deviation from perpendicular of less than 20° from the first side and second side of the first hydrophilic substrate.

In another embodiment, a chemical assay device has been developed. The chemical assay device includes a first hydrophilic substrate having a first side and a second side, a predetermined length and width, and a thickness of not more than 1 millimeter and a plurality of hydrophobic structures formed in the first hydrophilic substrate from a hydrophobic material. The hydrophobic material in each hydrophobic structure in the plurality of hydrophobic structures occupies more than 50% of a predetermined void volume fraction of the hydrophilic substrate, and each hydrophobic structure in the plurality of hydrophobic structures including the hydrophobic material extends from one arrangement in a plurality of arrangements of the hydrophobic material through substantially the thickness of the first hydrophilic substrate from the first side to the second side. Each arrangement of the hydrophobic material is formed on only the first side of the first hydrophilic substrate prior to penetration of the hydrophobic material into the first hydrophilic substrate with a single shape and size, and a ratio of a maximum area for a largest hydrophobic structure in the plurality of hydrophobic structures to a minimum area for a smallest hydrophobic structure in the plurality of hydrophobic structures is less than 1.25.

BRIEF DESCRIPTION OF THE DRAWINGS

The foregoing aspects and other features of a chemical assay device are explained in the following description, taken in connection with the accompanying drawings.

DETAILED DESCRIPTION

Figure 1:
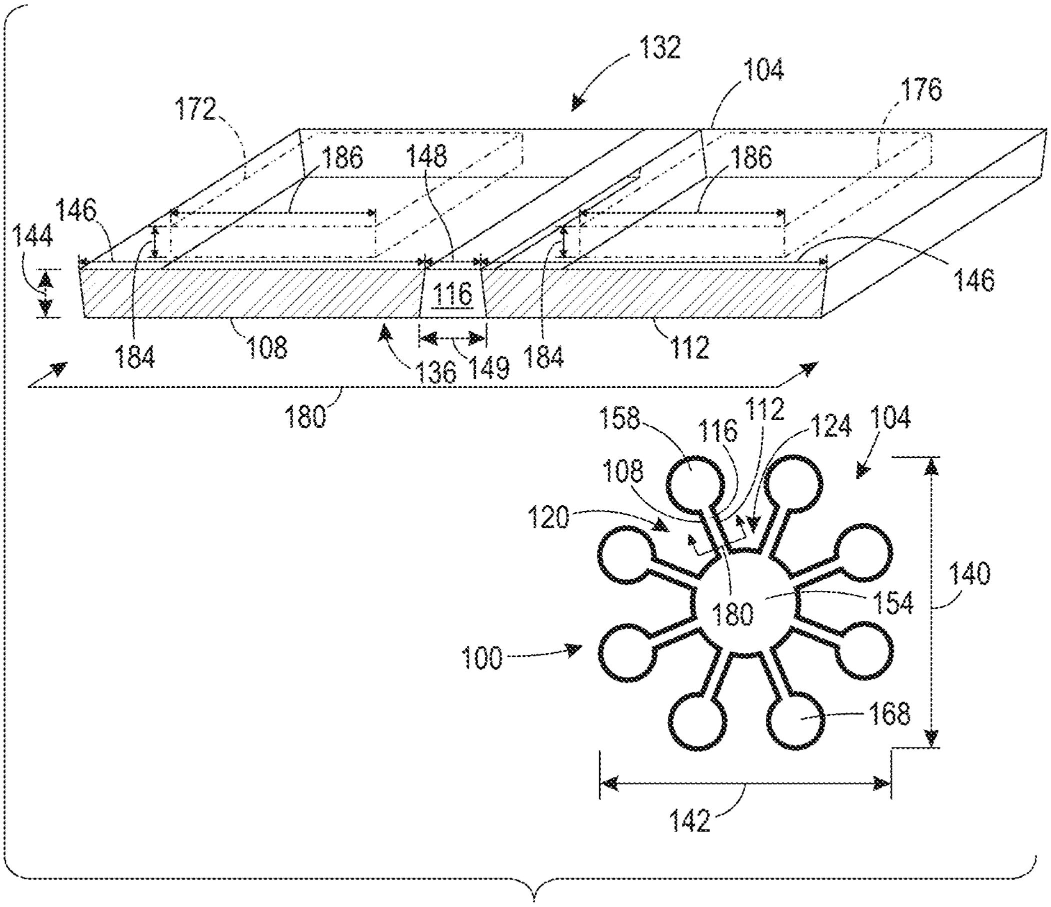
FIG. 1 is a diagram of a simplified single layer chemical assay device.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with resins or colorants on media, such as digital copiers, bookmaking machines, facsimile machines, multi-function machines, or the like. In the description below, a printer is further configured to deposit a melted wax, phase-change ink, or other hydrophobic material onto a porous substrate, such as paper. The printer is optionally configured to apply a temperature gradient and pressure to the substrate that spreads the hydrophobic material and enables the hydrophobic material to penetrate into the porous substrate to form channels and barriers that control the capillary flow of liquids, including water, through the substrate.

As used herein, the terms "hydrophilic material" and "hydrophilic substrate" refer to materials that absorb water and enable diffusion of the water through the material via capillary action. One common example of a hydrophilic substrate is paper and, in one specific embodiment, a filter paper, such as a cellulose filter paper, or chromatography paper forms the hydrophilic substrate. The hydrophilic substrates are formed from porous materials that enable water and other biological fluids that include water, such as blood, urine, saliva, and other biological fluids, to diffuse into the substrate. As described below, a hydrophobic material is embedded in the hydrophilic substrate to form fluid channels and other hydrophobic structures that control the diffusion of the fluid through the hydrophilic substrate.

As used herein, the term "hydrophobic material" refers to any material that resists adhesion to water and is substantially impermeable to a flow of water through capillary motion. When embedded in a porous substrate, such as paper, the hydrophobic material acts as a barrier to prevent the diffusion of water through portions of the substrate that include the hydrophobic material. The hydrophobic material also acts as a barrier to many fluids that include water, such as blood, urine, saliva, and other biological fluids. As described below, the hydrophobic material is embedded in a porous substrate to form channels and other hydrophobic structures that control the capillary diffusion of the liquid through the substrate. In one embodiment, the substrate also includes biochemical reagents that are used to test various properties of a fluid sample. The hydrophobic material forms channels to direct the fluid to different locations in the substrate that have deposits of the chemical reagents. The hydrophobic material is also substantially chemically inert with respect to the fluids in the channel to reduce or eliminate chemical reactions between the hydrophobic material and the fluids. A single sample of the fluid diffuses through the channels in the substrate to react with different reagents in different locations of the substrate to provide a simple and low-cost device for performing multiple biochemical tests on a single fluid sample.

As used herein, the term "phase change ink" refers to a type of ink that is substantially solid at room temperature but softens and liquefies at elevated temperatures. Some inkjet printers eject liquefied drops of phase change ink onto indirect image receiving members, such as a rotating drum or endless belt, to form a latent ink image. The latent ink image is transferred to a substrate, such as a paper sheet. Other inkjet printers eject the ink drops directly onto a print medium, such as a paper sheet or an elongated roll of paper. Phase-change ink is one example of a phase change material that is also a hydrophobic material. Examples of phase-change inks that are suitable for use in forming fluid channels and other hydrophobic structures in hydrophilic substrates include solid inks that are sold commercially by the Xerox Corporation of Norwalk, Conn. Because the phase change ink forms a solid phase after being formed into a printed image on the substrate, the phase change ink is one example of a hydrophobic material that can be formed into channels and other hydrophobic structures on a hydrophilic substrate to control the capillary diffusion of fluids in the hydrophilic substrate.

As used herein, the term "hydrophobic structure" refers to an arrangement of hydrophobic material that extends partially or completely through a thickness of a hydrophilic substrate to control a flow of fluids through the hydrophilic substrate. Examples of hydrophobic structures include, but are not limited to, fluid barriers, fluid channel walls, wells, protective barriers, and any other suitable structure formed from a hydrophobic material that penetrates the hydrophilic substrate. The term "well" refers to a type of hydrophobic structure that forms a circular or other enclosed region in the hydrophilic substrate to receive a fluid sample and contains the fluid sample within the well. As described below, an apparatus applies a temperature gradient and pressure to melt a layer of a hydrophobic phase-change material formed on a surface of a hydrophilic substrate to form different hydrophobic structures in the hydrophilic substrate in a controlled manner. In some embodiments, the hydrophobic structures are formed in multiple hydrophilic substrates and the hydrophobic material bonds the substrates together and forms fluid paths through multiple hydrophilic substrates. In a chemical assay device, the hydrophobic structures are arranged in predetermined patterns that form hydrophobic structures including fluid channels, deposit sites, and reaction sites around bare portions of a hydrophilic substrate, to bond two or more hydrophilic substrates together in multi-layer devices, and to form protective layers that prevent contamination of the chemical assay devices.

Illustrative embodiments of apparatuses are described below that apply a temperature gradient and pressure using two members, such as rotating cylindrical rollers or plates, to form hydrophobic structures in hydrophilic substrates with improved structural shape and robustness, reduced variation in structure size and shape, and to bond substrates together without requiring intermediate adhesive layers. As used herein, the term "engage" when referencing the members in an apparatus that applies heat and pressure between two members to form hydrophobic structures in a hydrophilic substrate refers to either direct contact between a member and one surface of a hydrophilic substrate or stack of substrates, or indirect contact through an intermediate layer.

As used herein, the term "plate" refers to a member with a surface that is configured to engage one side of substrate where at least the portion of the surface of the plate that engages the substrate is substantially smooth and planar. In some embodiments, the surface of the plate engages an entire side of the substrate. As described below, in some embodiments of a structure formation unit, the two members are plates. The two plates apply a temperature gradient and pressure to two sides of one substrate or either end of a stack of substrates. When one plate is heated to have a uniform surface temperature that is sufficiently high to melt one or more layers of a hydrophobic phase-change material, the hydrophobic material penetrates one or more layers of the substrate to form hydrophobic structures in the substrate. When one plate is heated to an elevated temperature while the other plate remains at a lower temperature, the melted hydrophobic material flows towards the higher-temperature plate to a greater degree than the lower temperature plate.

As used herein, the term "dwell time" refers to an amount of time that a given portion of one or more substrates spend between members in a structure formation unit. In an embodiment where the members in the structure formation unit are rollers, the amount of dwell time is related to the surface areas of the rollers that form the nip and the linear velocity of the substrate through the nip. The dwell time is selected to enable the phase-change material to penetrate the substrates and to bind the substrates together. The selected dwell time can vary based on the thickness and porosity of the substrates, the temperature gradient in the nip, the pressure in the nip, and the viscosity characteristics of the phase-change material that binds the substrates together. Larger rollers typically form a nip with a larger surface area. Thus, embodiments of bonding apparatuses with larger roller diameters operate with a higher linear velocity to achieve the same dwell time as other embodiments with smaller diameter rollers.

In a traditional inkjet printer, the phase change ink is transferred to one side of a substrate, with an option to transfer different phase change ink images to two sides of a substrate in a duplex printing operation. The printer spreads the phase change ink drops on the surface of the substrate, and the phase change ink image cools and solidifies on the surface of the print medium to form a printed image. The embodiments described below, however, apply heat and pressure to phase-change ink or another hydrophobic material on the surface of the substrate to enable the hydrophobic material to penetrate through the porous material in the substrate to form a three-dimensional barrier through the thickness of the substrate that controls the diffusion of fluids through the substrate.

FIG. 1 depicts a simplified single layer chemical assay device 100 that includes a hydrophilic substrate 104 (or more simply, "substrate") and hydrophobic structures, including fluid barrier walls 108 and 112, which form channels, such as channel 116, and other fluidic structures in the substrate 104. FIG. 1 includes an overhead view and a partial cut-away view along line 180 of the chemical assay device 100. The substrate 104 has a planar shape with a first side 132 and a second side 136, a predetermined length 140 and width 142, and a thickness 144 of not more than 1 millimeter. In one embodiment, the hydrophilic substrate 104 is formed from cellulose filter paper having a thickness of approximately 0.1 mm to 0.2 mm. The length 140 and width 142 of the chemical assay device are selected based on the length and width dimensions of the hydrophobic structures and other features that are placed on the device. For example, in FIG. 1 the device 100 has length and width dimensions of approximately 3 cm by 3 cm, although different chemical assay devices can have different dimensions and length to width ratios. In some embodiments a larger substrate, such as a sheet or roll of paper, carries multiple printed arrangements of hydrophobic material that form the fluid barrier walls 108 and 112 and other hydrophobic structures in an array of chemical assay devices. The larger substrate is then cut into smaller individual substrate pieces similar to the substrate 104 in the sensor 100.

As depicted in FIG. 1, the chemical assay device 100 includes multiple hydrophobic structures including, but not limited to, the fluid barrier walls 108 and 112 that are separated from each other by a predetermined distance along the length 140 and width 142 of the substrate 104 to form a fluid channel 116. Using the fluid barrier wall 108 as an example of a hydrophobic structure, the fluid barrier wall 108 penetrates from the first side 132 of the substrate 104 through to the second side 136 of the substrate 104 through substantially the entire thickness 144 of the substrate 104.

The hydrophobic structures in the chemical assay device 104 are formed from one or more arrangements of hydrophobic material that are deposited on one side of the substrate 104 and subsequently penetrate the substrate 104 to form the hydrophobic structures that extend through the thickness 142 of the substrate 104. In FIG. 1, an inkjet printer or other suitable deposition device forms one or more arrangements of the hydrophobic material on the first side 132 of the substrate 104. The size, shape, and position of the arrangements of the hydrophobic material on the surface of the substrate 104 correspond directly to the size, shape, and positions of the hydrophobic structures that are formed in the substrate 104 from the hydrophobic material. For example, FIG. 1 depicts arrangements of hydrophobic material 172 and 176 that are formed on the first side 132 of the substrate 104. Each of the arrangements of hydrophobic material 172 and 176 is formed in a linear shape corresponding to the position and length of the fluid barrier walls 108 and 112, respectively. Each of the arrangements 172 and 176 is formed from the hydrophobic material with a predetermined width 186, which is approximately 400 μm in FIG. 1, and a predetermined thickness 184, which is between 50 μm and 400 μm for a range of substrate thicknesses where the thickness of the hydrophobic material is proportional to the thickness of the substrate.

In the chemical assay device 100, the fluid channel barriers 108 and 112 are formed from the arrangements of hydrophobic material 172 and 176, respectively, that penetrate the substrate 104. In the finished chemical assay device 100, most or all of the hydrophobic material that is originally formed in the hydrophobic arrangements 172 and 176 is urged into the substrate 104 to form the hydrophobic structures 108 and 112. As the hydrophobic material penetrates the substrate 104, the hydrophobic material spreads laterally along the length 140 and width 142 of the substrate 104 to some degree, but the degree of lateral spread is substantially reduced from prior art devices. Instead, a much larger portion of the hydrophobic material that forms each hydrophobic structure penetrates through the thickness of the substrate 104 from the first side 132 toward the second side 136 to form fluid barrier walls and other hydrophobic structures with more sharply defined features and with more effective penetration of the substrate 104 than in prior art devices.

Using FIG. 1 as an example, the arrangement of the hydrophobic material 172 formed on the first side 132 of the substrate 104 is formed with a width of approximately 400 μm. The hydrophobic material penetrates the substrate 104 to form the hydrophobic fluid barrier wall 108 with a maximum width on the first side 132 of approximately 670 μm. The amount of spread from the width of the printed arrangement of hydrophobic material 172 to the maximum width of the hydrophobic structure 108 is determined with reference to the flow of the hydrophobic material into the hydrophilic substrate and the thickness of the hydrophilic substrate. As used herein, the term "spread factor" (S) refers to a factor that corresponds to a degree of spread from an initial narrower width of the arrangement of hydrophobic material that is formed on a surface of a hydrophilic substrate to the final broader width of the hydrophobic structure that is formed from the hydrophobic material in the arrangement. The absolute increase in width from the printed arrangement of hydrophobic material to the hydrophobic structure corresponds to the thickness of the substrate, with thicker substrates experiencing a greater degree of spread. The spread factor S is determined empirically from the following equation:

$$S = \frac{l_2 - l_1}{t}$$

where $l_1$ is the width of the arrangement of hydrophobic material prior to penetrating the hydrophilic substrate (width 186 in FIG. 1), $l_2$ is the maximum width of the hydrophobic structure (width 146 on the first side 132 of the substrate 104 in FIG. 1), and t is the thickness of the substrate (thickness 144 in FIG. 1). The spread factor S remains substantially constant for different paper thicknesses, although the absolute degree of spread is affected by the thickness of the hydrophilic substrate. The apparatus embodiments that are described below in FIG. 5-FIG. 7 enable the formation of hydrophobic structures with lower spread factors than the prior art reflow ovens that produce higher spread factors due to the isotropic diffusion of the hydrophobic material through the hydrophilic substrate in a reflow oven.

In the illustrative embodiment of FIG. 1, the value S is $$S = \frac{670\ \mu\text{m} - 400\ \mu\text{m}}{180\ \mu\text{m}} = 1.5,$$

which is less than two to one. In contrast, the prior art sensors exhibit a much greater degree of spread $$S' = \frac{1000\ \mu\text{m} - 300\ \mu\text{m}}{180\ \mu\text{m}} \approx 3.9.$$

For any given substrate thickness, the chemical assay sensor device of FIG. 1 includes a much smaller degree of spread than the prior art chemical assay devices. The final width $l_2$ of the hydrophobic structure after spreading given a particular value of S is given as: $l_2=St+l_1$. Table 1 depicts the absolute degree of spread, measured in microns, for the spread factor S=1.5 in the chemical assay devices 100 and 450 compared to the prior art S'=3.9 based for a fixed-width printed pattern $l_1$=400 μm over a range paper thicknesses to illustrate the difference in spread.

TABLE 1

| | t (μm) | | | | | | | | | |
|---|---|---|---|---|---|---|---|---|---|---|
| | 100 | 200 | 300 | 400 | 500 | 600 | 700 | 800 | 900 | 1000 |
| $l_2$ (μm) (S = 1.5) | 550 | 700 | 850 | 1000 | 1150 | 1300 | 1450 | 1600 | 1750 | 1900 |
| $l'_2$ (μm) (S' = 3.9) | 790 | 1180 | 1570 | 1960 | 2350 | 2740 | 3130 | 3520 | 3910 | 4300 |

As described below, the width of the hydrophobic structures tapers somewhat toward the second side, but the degree of taper and deviation of the hydrophobic structure walls from perpendicular relative to the first and second sides of the substrate. Apparatuses that enable arrangements of hydrophobic material to penetrate a hydrophilic substrate to form hydrophobic structures with the properties described above are described in more detail below.

The width ratios that are depicted in FIG. 1 are substantially less than the ratios of prior art devices, which are typically on the order of more than 3 to 1, where one prior art device forms channel walls with a width of approximately 1000 μm from printed lines of hydrophobic material that have an initial width of 300 μm in a substrate with a thickness of approximately 200 μm. Thus, even though the arrangements of the hydrophobic material 172 and 176 on the first side 132 of the substrate 104 are wider than similar prior-art arrangements, the corresponding hydrophobic structures in the substrate 104 are narrower and more well defined than the prior art devices.

The ability to form wider arrangements of the hydrophobic material while still forming narrower and more well-defined hydrophobic structures is advantageous because the wider hydrophobic material arrangements include a larger volume of the hydrophobic material that subsequently forms the hydrophobic structures with a denser configuration than the prior art. A first fraction of the volume within a hydrophilic substrate is occupied by the fibrous material (e.g. cellulose in many forms of paper) that forms the substrate. As used herein, the term "void volume fraction" refers to a fraction of the volume of the hydrophilic substrate that includes open pores and other voids that can be filled by another fluid such as air, water, or a liquefied hydrophobic material. The liquefied hydrophobic material subsequently returns to a solid phase to form a hydrophobic structure that occupies the voids. The void volume fraction varies for different types of hydrophilic material, such as different grades of paper, with some grades of high porosity filter paper having a void volume fraction of 20-25% of the total volume of the paper. The void volume fraction in a particular hydrophilic substrate forms an upper bound for the density of the hydrophobic structures since the hydrophobic material in the hydrophobic structure only occupies the voids in the hydrophilic substrate.

The chemical assay devices 100 and 450 include hydrophobic structures that occupy a high proportion of the maximum available void volume fraction in the hydrophilic substrate. For example, in the hydrophobic structure 108 the ratio between the initial volume for a given length for the hydrophobic material arrangement 172 and the corresponding volume ratio for the given length of the hydrophobic structure 108 is $$\emptyset = \frac{w_a h_a}{w_s h_s} = \frac{(400\ \mu\text{m})(50\ \mu\text{m})}{(670\ \mu\text{m})(180\ \mu\text{m})} \approx 0.17,$$

where $w_a$ and $h_a$ the width and height, respectively, of the arrangement of hydrophobic material, and $w_s$ and $h_s$ are the width and height, respectively, of the hydrophobic structure that is formed from the hydrophobic material in the arrangement. In a hydrophilic substrate with a 20% void volume fraction, the parameter Ø of 0.17 (17%) corresponds to a large fraction of the available void volume being occupied by the hydrophobic material. The, hydrophobic structure occupies 85% (17%/20%) of the 20% void volume fraction in the hydrophilic substrate that is available to accept the hydrophobic material. By contrast, the hydrophobic material in prior art chemical assay devices experiences a much greater degree of spread that does not fill the available voids in the hydrophilic substrate efficiently, with a volume ratio of, for example, $$\emptyset' = \frac{(300\ \mu\text{m})(50\ \mu\text{m})}{(1000\ \mu\text{m})(180\ \mu\text{m})} \approx 0.083,$$

where the hydrophobic material only occupies 41.5% (8.3%/20%) of the available void volume fraction. The prior art hydrophobic structure leaves a much larger portion of the void volume fraction in the substrate unoccupied (e.g. less than 50% occupied), which increases the likelihood that voids in the prior art hydrophobic structures would enable fluid to escape from a fluid channel or otherwise penetrate the hydrophobic structure. However, the hydrophobic structures in the chemical assay devices 100 and 450 fill a higher proportion of the void volume fraction that exceeds 50% of the available void volume, which produces more robust hydrophobic structures that are less likely to include gaps or other defects that would enable fluid to diffuse through fluid barrier walls or other hydrophobic structures compared to the prior art chemical assay devices.

In the illustrative embodiment of FIG. 1, the hydrophobic structures 172 and 176 are separated from each other along the length and width of the substrate 104 to form a fluid channel 116. The fluid channel 116 is formed from a portion of the hydrophilic material in the substrate 104 that does not include the hydrophobic material and enables a fluid to diffuse through the hydrophilic material in the substrate 104. In FIG. 1, the fluid channel 116 has a width that varies from approximately 100 μm near the first side 132 (dimension line 148) to approximately 130 μm near the second side 136 (dimension line 149). The width of the channel 116 varies due to the spread pattern for the hydrophobic material that forms the fluid barrier walls 108 and 112 around the channel 116. In the embodiment of FIG. 1, the sides of the fluid barrier walls 108 and 112 each have a lateral variance along the width of the channel 116 of approximately 15 μm, which produces a total variance of approximately 30 μm for both fluid barrier walls 108 and 112, from the narrowest portion of the channel 116 near the first side 132 to the widest portion of the channel 116 at the second side 136. The variance in the width of the fluid barriers walls that form the fluid channels affects the practical widths for different fluid channels in a chemical assay device. For example, in the prior art chemical assay devices, the hydrophobic material that forms the channel walls spreads laterally to a much greater degree than the fluid barrier walls 108 and 112 in FIG. 1. In one example, the prior art device includes a fluid channel with a width that varies from 355 μm to 765 μm, which is greater than a 2 to 1 ratio between the widest and narrowest portions of the prior-art fluid channel. In contrast, the fluid channel 116 in FIG. 1 only has a maximum to minimum width ratio of approximately 1.3 to 1 even with a substantially narrower absolute width than the prior art fluid channels. The greater variance of the channel width in the prior art devices due to the lateral spread of hydrophobic material in the channel walls requires larger channel widths because of variations in the manufacturing process that would result in an unacceptable high number of blocked channels in situations where the hydrophobic material that forms fluid channel barriers actually merges together to block the channel. In the chemical assay device 100 of FIG. 1, however, the fluid barrier wall structures 108 and 112 have substantially less variation in width, and the reduced variation enables the formation of the chemical assay device 100 with fluid channels that are substantially narrower than prior art devices but that are also effective in enabling the diffusion of fluid through the hydrophilic substrate 104 in a controlled manner.

Figure 2:
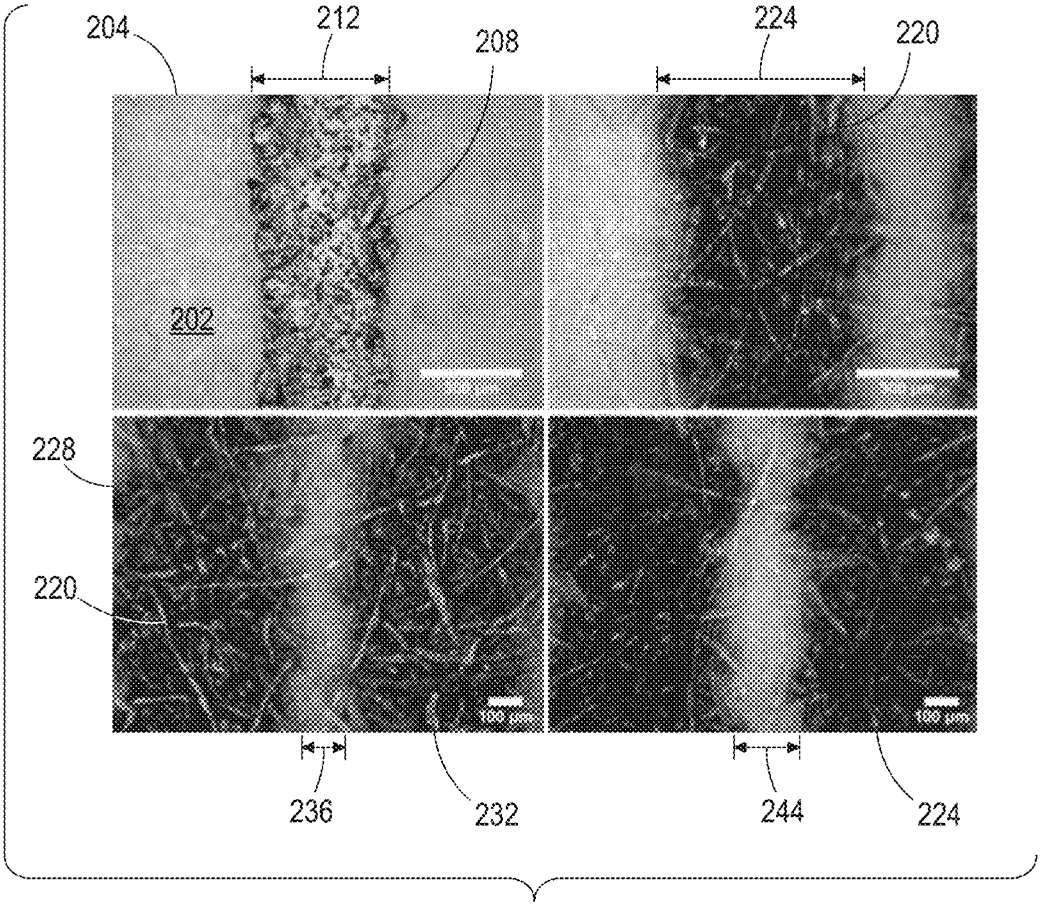
FIG. 2 is a diagram of hydrophilic channel and hydrophobic barrier.

FIG. 2 depicts photographic images of an arrangement of hydrophobic material formed on a surface of a hydrophilic substrate, corresponding hydrophobic structures that penetrate the substrate, and a fluid channel formed between two hydrophobic structures. The photographs in FIG. 2 are from a practical embodiment of a chemical assay device that includes hydrophobic fluid barrier walls is similar to the device 100 of FIG. 1. In FIG. 2, the image 204 depicts an arrangement of hydrophobic material 208, such as a phase-change ink, that is formed on a first side of a hydrophilic substrate 202. The arrangement of hydrophobic material 208 has a predetermined width 212 of approximately 391 μm. The image 216 depicts the first side of the hydrophilic substrate after the hydrophobic material in the arrangement 208 has penetrated the substrate 202 to form a hydrophobic structure, such as a fluid barrier wall 220. The fluid barrier wall 220 has a maximum width 224 of approximately 654 μm. In FIG. 2, the image 228 depicts the fluid barrier wall 220 and another fluid barrier wall 232 with substantially the same width separated from each other on the substrate 202 to form a fluid channel. The image 228 is of the first side of the substrate 202 where the fluid barrier walls 220 and 228 have a maximum width. The fluid channel has a width 236 of approximately 103 μm near the first side of the substrate. The image 240 depicts the same fluid barrier walls 220 and 224 along with the fluid channel from the second side of the substrate where the fluid barrier walls 220 and 228 have a minimum width. In the image 240, the fluid channel has a width 244 of approximately 131 μm.

Figure 3:
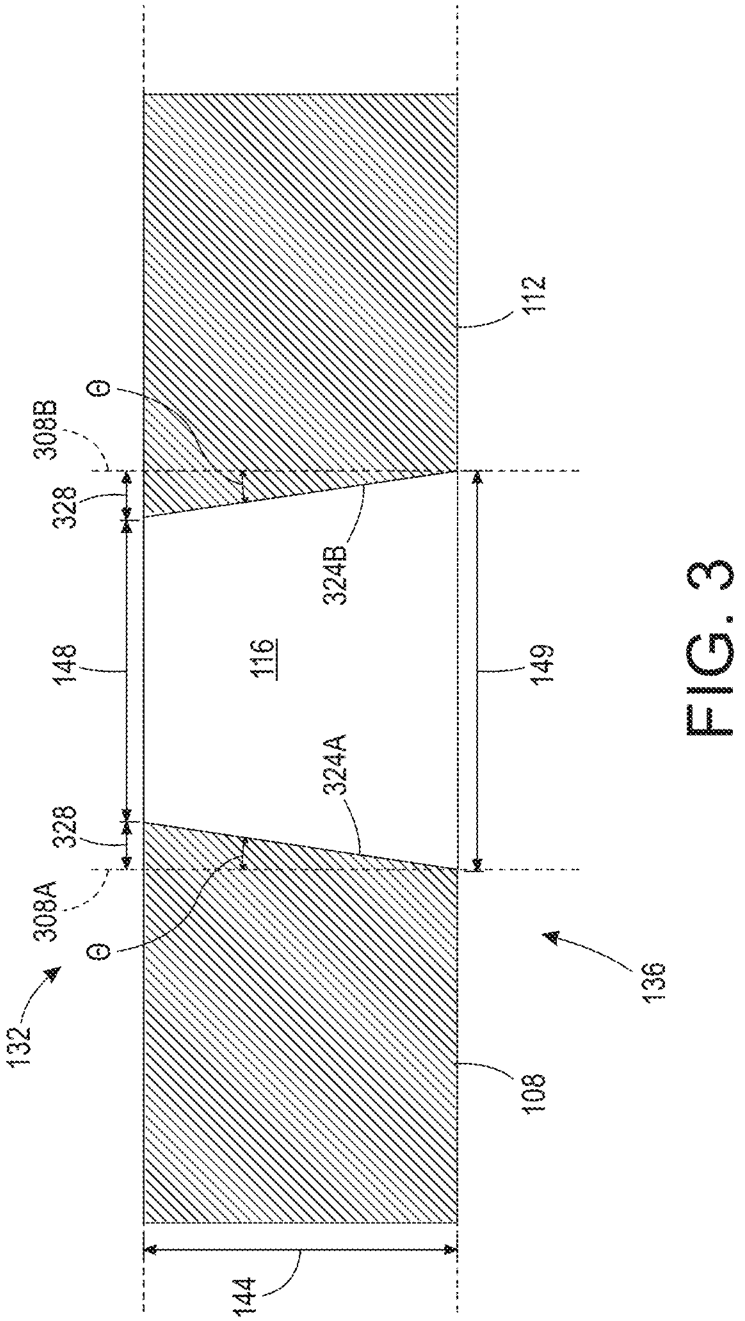
FIG. 3 is a diagram depicting a fluid channel in the chemical assay device of FIG. 1.

FIG. 3 depicts the variation in the width of the channel 116 due to the distribution of the hydrophobic material in the fluid barrier walls 108 and 112. In FIG. 3, the fluid barrier walls 108 and 112 are depicted with inner surfaces 324A and 324B, respectively, on two sides of the channel 116. Each of the surfaces 324A and 324B deviates from a perpendicular axis between the plane of the first side 132 and the plane of the second side 136, where the lines 308A and 308B depict the perpendicular axis. The angle of deviation θ corresponds to the relative difference in the lateral spread of the hydrophobic material in the substrate 104. For example, in FIG. 3 the lateral spread for each of the fluid barrier walls 108 and 112 is approximately 15 μm as depicted by dimension lines 328. In a hydrophilic substrate with a thickness of 180 μm along dimension line 144, the angle of deviation from perpendicular θ is determined as:

$$\theta = \operatorname{atan}\left(\frac{15\ \mu\text{m}}{180\ \mu\text{m}}\right) = \operatorname{atan}(0.083) \approx 4.7^\circ.$$

The angle θ can vary based on different hydrophilic substrate and hydrophobic material compositions and thicknesses, but the angles of deviation are typically less than 20°. The angles of deviation in the embodiments described herein are substantially less than the prior art hydrophobic layers that have angles of deviation of approximately 45° due to the much larger degree of spread of hydrophobic material through the substrate in prior art devices.

Figure 8:
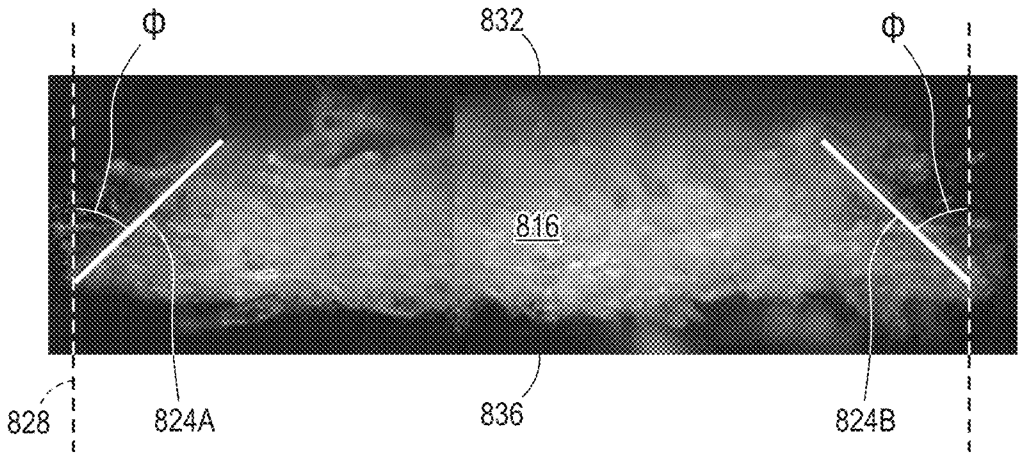
FIG. 8 PRIOR ART
FIG. 8 is a cross-sectional view of a prior art chemical assay device with hydrophobic walls that show a strong degree of lateral variation.
Figure 9:
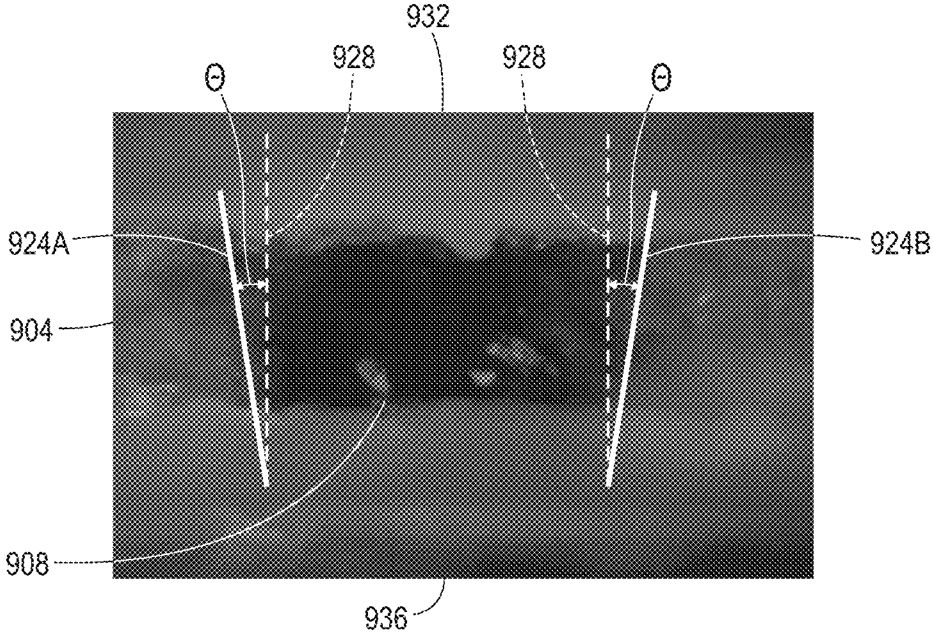
FIG. 9 is a cross-sectional view of one embodiment of the chemical assay device of FIG. 1 with hydrophobic structures that show a small degree of lateral variance.

While FIG. 3 depicts the inner surfaces 324A and 324B with smooth and linear shapes, those having skill in the art will recognize that FIG. 3 is a simplified illustration for clarity and that the surfaces of fluid barrier walls and other hydrophobic structures in a hydrophilic substrate typically have variations in shape. For example, the hydrophobic material in the fluid barrier walls 108 and 112 penetrates the hydrophilic substrate 104 to form the channel walls 324A and 324B with curved shapes instead of the linear surfaces depicted in FIG. 3. Additionally, the hydrophobic material often wicks onto fibers and other structures in the hydrophilic substrate 104 that form variations in the surface of the channel walls 32A and 324B. The curvature and variations in surfaces of the fluid barrier walls are substantially smaller than prior art devices due to the controlled penetration of the hydrophobic material in the chemical assay device 100. FIG. 8 includes a photographic image of a prior art chemical assay device that depicts surfaces of fluid barrier walls around a fluid channel. FIG. 9 include photographic images of a practical embodiment of the chemical assay device 100 that illustrates the improved structural characteristics of the fluid barrier walls and other hydrophobic structures in the device 100. FIG. 8 depicts a prior art chemical assay device with a fluid channel 816 and fluid barrier walls 824A and 824B. The fluid barrier walls 824A and 824B deviate from the perpendicular axis 828 by an angle Φ of nearly 45°. FIG. 9 depicts a single fluid barrier wall 908 with sides 924A and 924B that extend from the first side 932 to a second side 936 of a hydrophilic substrate 904. The angle of deviation θ in FIG. 9 for both sides 924A and 924B of the fluid barrier wall 1008 is approximately 4.7°.

Referring again to FIG. 1, during operation of the chemical assay device 100, a fluid sample is placed in a deposit site 154 that is formed in the center of a radial array of fluid channels and reaction sites, including the fluid channel 116 and reaction sites 158 and 168. The hydrophobic structures formed in the substrate 104 control the diffusion of the fluid through the hydrophilic material to guide portions of the fluid from the central deposit site 154 to the reaction sites. For example, the hydrophobic material that forms the fluid barrier walls 108 and 112 around the channel 116 is impermeable to the liquid sample to prevent the fluid sample from diffusing out of the channel 116 to the regions 120 and 124 in the substrate 104. Additionally, the hydrophobic material in the fluid barrier walls 108 and 112 has a low surface energy with respect to the fluid sample, which prevents adhesion of the fluid sample to the fluid barrier walls 108 and 112. Thus, the fluid in the sample diffuses through the substrate 104 from the deposit site 154 through the channel 116 to the reaction site 158 in a controlled manner. Chemical reagents that are embedded in the hydrophilic substrate 104 at the different reaction sites can react with the fluid to change the color of the substrate 104 or otherwise generate an analytical result based on the chemical composition of the fluid. In the chemical assay device 100, the reaction sites 158, 168 and the other reaction sites optionally include different chemical reagents to enable the single chemical assay device 100 to perform multiple assays for a single fluid sample.

The chemical assay device 100 of FIG. 1 includes a single hydrophilic substrate that controls the diffusion of a fluid sample along the length and width of the substrate in with two degrees of freedom. Other chemical assay device embodiments are formed from stacks of two or more hydrophilic substrates that control diffusion of a fluid sample through fluid channels formed along the lengths and widths of individual substrates and between substrates with three degrees of freedom. The stacked substrates in a multi-substrate chemical assay device are bonded together with corresponding regions of the fluid channels in each substrate being aligned with fluid channels in one or two adjacent substrates to enable the fluid to diffuse through then entire stack of substrates.

Figure 4:
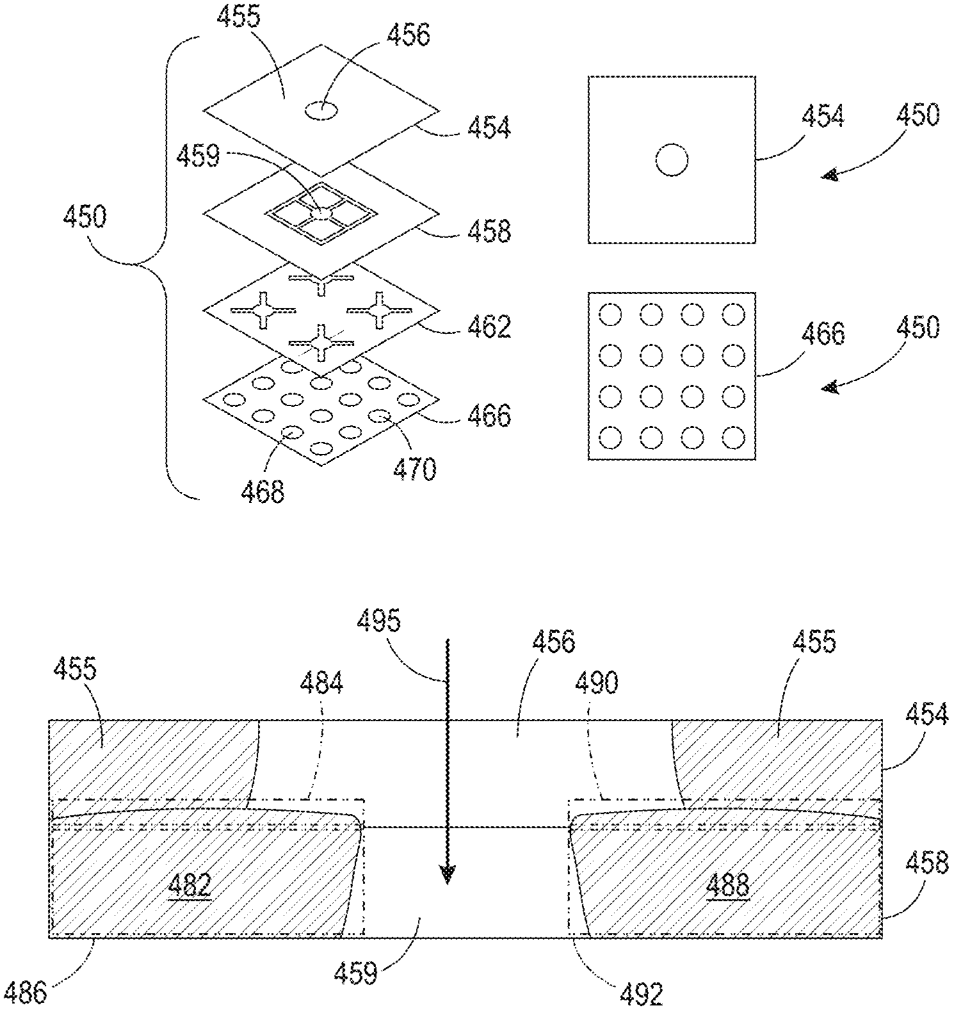
FIG. 4 is a diagram of a chemical assay device that is formed from multiple hydrophilic substrates.

FIG. 4 depicts a multi-substrate chemical assay device 450. The chemical assay device 450 includes four hydrophilic substrates 454, 458, 462, and 466, which are embodied as separate sheets of filter paper in FIG. 4. The device layers 454-466 form a stack of multiple hydrophilic substrates and layers of hydrophobic material that form fluid channels in the hydrophilic substrates and bond the hydrophilic substrates together. In one embodiment, the chemical assay device 450 is a biomedical testing device that receives a sample of a bodily fluid at a deposit site 456 in the substrate 454 and produces results at one or more of reaction sites in the substrate 466, including reaction sites 468 and 470. Common examples of biomedical testing devices include devices that test blood samples to determine blood sugar levels and other properties of a blood sample.

In the chemical assay device 450, each of the substrates includes fluid channels that are formed from hydrophobic material, and the substrates are bonded together to form the device 450. In the illustrative example of the chemical assay device 450, the layer 454 is an inlet layer with a region 455 that is formed from the hydrophobic material and a deposit site 456 that is formed from the bare paper substrate and receives drops of the fluid sample. The hydrophobic material in the region 455 seals the chemical assay device 450 from one side and controls the diffusion of biomedical fluids that are placed on the deposit site 456. The layers 458 and 462 each include patterns of the hydrophobic material forming intermediate fluid channels that direct the fluid from the inlet layer 454 to different test sites in the layer 466. For example, the test site 468 includes a chemical reagent that tests for protein levels in a blood sample and the test site 470 includes a chemical reagent that tests for glucose levels in the blood sample. The pattern of the hydrophobic material on the substrate layer 466 forms barriers to prevent diffusion of the fluid between the test sites and enables the substrate layer 466 to be bonded to the substrate layer 462.

As described above, the multi-substrate chemical assay device 450 includes multiple substrates that are bonded together using the same hydrophobic material that forms fluid channels and other hydrophobic structures in the individual hydrophilic substrates. The multi-substrate chemical assay device 450 does not require special adhesive material or additional intermediate adhesive layers between the hydrophilic substrates, which are required to bond substrates in prior-art multi-substrate devices. FIG. 4 depicts a partial cross-sectional view of the substrates 454 and 458 from the device 450 to illustrate the structure of the hydrophobic material that bonds the two substrate layers together. In the substrate 454, the hydrophobic material forms the region 455 that surrounds the fluid deposit side 456. The hydrophobic material in the region 455 penetrates substantially the entire thickness of the substrate 454 in similar manner to the hydrophobic structures that are described above in the chemical assay device 100. The substrate 458 also includes hydrophobic structures that form fluid channels through the substrate 458. FIG. 4 depicts hydrophobic structures 482 and 488 in the substrate 458.

A first portion of the hydrophobic material in the structures 482 and 488 penetrates the substrate 458 to form fluid barrier walls and other hydrophobic structures as depicted in regions 486 and 492, respectively. A second portion of the hydrophobic material in the structures 482 and 488 penetrates into the substrate 454, as depicted in the regions 484 and 490, respectively. The portion of the hydrophobic material from the substrate 548 that penetrates the substrate 454 bonds the two substrates together. As depicted in FIG. 4, a smaller portion of the hydrophobic material in the regions 484 and 490 bonds the two substrates together compared to the larger volume of the hydrophobic material in the regions 486 and 492 that form hydrophobic structures in the substrate 458. Additionally, a portion of the hydrophobic material remains between the substrates 454 and 458 to maintain the bond between the two substrates. As depicted in FIG. 4, the smaller portion of the hydrophobic material in the regions 484 and 490 bonds the substrates 454 and 458, but does not block the diffusion of fluid through the fluid inlet region 465. Thus, a fluid sample diffuses through the deposit site region 456 to a fluid channel 459 as depicted by the arrow 495. Additionally, the hydrophobic material in the portions of the hydrophobic structure 455 of the substrate 454 that overlap the regions 484 and 490 may merge with the hydrophobic material from the substrate 458 to increase the strength of the bond between the two substrates. The remaining hydrophilic substrate layers 462 and 466 are bonded to each other and to the substrate 458 in a similar manner.

Figure 10:
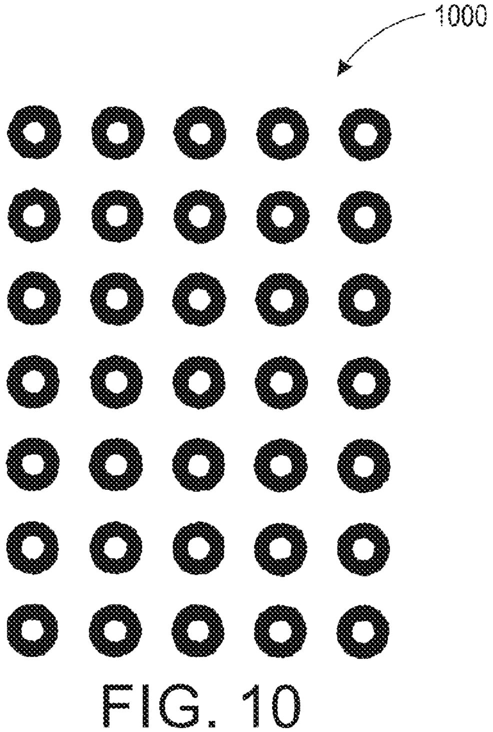
FIG. 10 PRIOR ART
FIG. 10 is a depiction of a prior art array of well hydrophobic structures that show a large degree of variance in area.

FIG. 10 depicts an array of well structures in a prior art chemical assay device. The array of well structures 1000 in FIG. 10 are formed in a reflow oven, such as the oven depicted in FIG. 12A, that melts the hydrophobic material in the wells 1000. The melted hydrophobic material in the device of FIG. 10 diffuses into a substrate, which produces a larger degree of spread for the hydrophobic material in comparison to the array 1100 that is depicted in FIG. 11.

Figure 11:
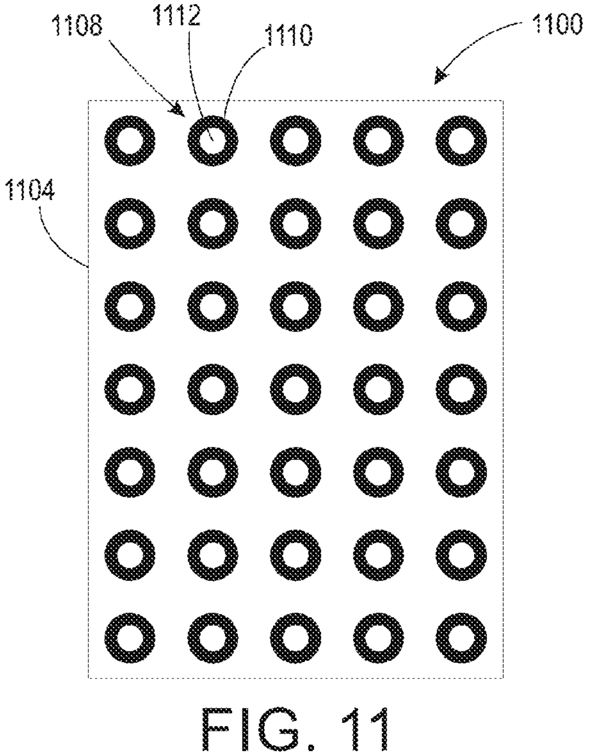
FIG. 11 is a depiction of an array of well hydrophobic structures that show a small degree of variance area.

FIG. 11 depicts an array of well structures that are formed in a chemical assay device that is similar to the devices of FIG. 1 and FIG. 4, including a hydrophilic substrate 1104 and a two-dimensional array of well structures such as the well 1108. As depicted in FIG. 11, each well is formed from an annular arrangement of the hydrophobic material that forms a fluid barrier wall, such as the wall 1110, which surrounds an inner circular region 1112 of the hydrophilic substrate. In the embodiment of FIG. 11, the annular well walls completely enclose the central region and fluid samples enter the wells from the surface of the first or second side of the substrate 1104. In other embodiments, the well wall includes an opening for a fluid channel to enable fluid to enter the well laterally through the hydrophilic substrate, in a similar manner to the reaction sites 158 and 168 in FIG. 1.

Ideally, each of the well structures in the respective arrays 1000 and 1100 should have the same size and shape, although practical embodiments experience variations in the sizes and surface areas of the well structures. The level of variation between the surface areas for the well structures 1000 in FIG. 10 is greater than in the array 1100 of FIG. 11. In the prior art array of wells 1000, the ratio of maximum area to minimum area between the smallest and largest wells is 1.35 to 1 with a standard of deviation in area for a large array of wells being approximately 0.068. In the array of wells 1100, however, the same maximum area to minimum area ratio is 1.15 to 1, and the standard of deviation for well area is approximately 0.038.

The narrower range in variation between the wells in the array 1100 of FIG. 11 improves the consistency of results from tests that are performed using a chemical assay device that includes the wells of FIG. 11 and other similar structures. In many chemical assay devices, the region of the hydrophilic substrate within each well receives a chemical reagent that subsequently reacts with a fluid sample. Each well typically receives the same amount of reagent, but if the interior well areas are substantially smaller or larger than a predetermined target size due to variations in the spread of the hydrophobic material in the well walls, then the effective concentration of the reagent within each well also varies. Thus, the well structures of FIG. 11 that are formed with more consistent sizes enable a more uniform distribution of the reagent across multiple wells in one chemical assay device and between different chemical assay devices in a production run. The more consistent concentration of the reagent enables the chemical assay devices, such as the devices that use the well array 1100 and other suitable hydrophobic structures, to provide more consistent results during use.

Figure 12A:
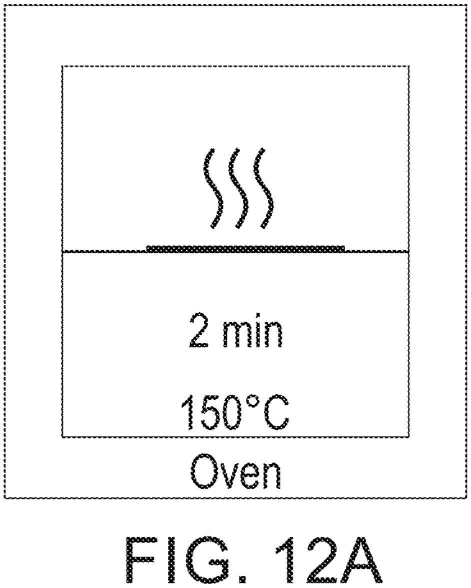
FIG. 12A PRIOR ART
FIG. 12A is a prior art reflow oven that is used to produce the prior art embodiments depicted in FIG. 8 and FIG. 10.

The single substrate and multi-substrate chemical assay devices that are depicted above with improved hydrophobic structural characteristics are not formed using the prior art reflow oven of FIG. 12A. Instead, an apparatus applies heat and pressure in a controlled manner to form the hydrophobic structures depicted above in a hydrophilic substrate. The embodiments presented below are illustrative apparatuses that can be used to form the hydrophobic structures in chemical assay devices of FIG. 1, FIG. 4, and FIG. 11.

Figure 5:
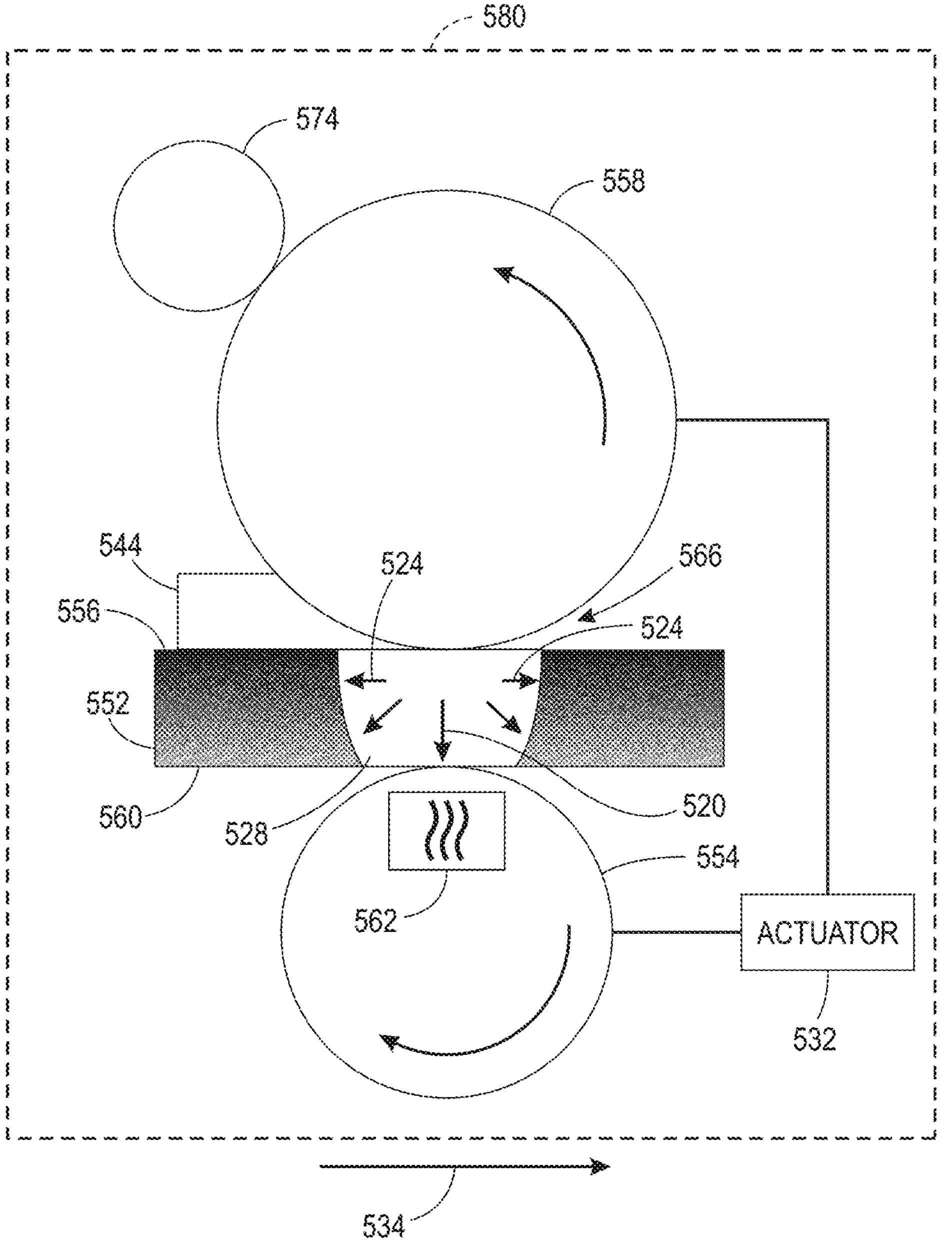
FIG. 5 is a schematic diagram of an apparatus that forms hydrophobic structures in a hydrophilic substrate.

FIG. 5 depicts an apparatus 580 with two members, which are embodied as a first cylindrical roller 554 and a second cylindrical roller 558, that apply a temperature gradient and pressure to form the hydrophobic structures in the chemical assay devices depicted above. A heater 524 is operatively connected to the first cylindrical roller 554 to heat a surface of the first cylindrical roller 554 to a higher temperature, such as 70° C. to 140° C., than the surface of the second cylindrical roller 558, which typically remains near ambient temperature. The first roller 554 and second roller 558 engage each other in a nip 556, and a hydrophilic substrate 552 with a first side 556 that bears a layer of hydrophobic material 544 moves between the rollers 554 and 558 in the nip 566. The hydrophobic material 544 and the first side 556 of the substrate 552 engage the lower-temperature second roller 558 while a blank second side 560 of the substrate 552 engages the higher temperature first roller 554. An actuator 532 is operatively connected to one or both of the rollers 554 and 558 and applies pressure between the rollers 554 and 558, with one embodiment of the actuator 532 applying pressure in a range of 800 PSI to 3,000 PSI. An optional cleaning roll 574 removes residual hydrophobic material from the surface of the second roller 558.

During operation, the rollers 554 and 558 rotate as indicated to move the substrate 552 in a process direction 534. The heat and pressure in the nip 566 melts the hydrophobic material 544 and enables the hydrophobic material to penetrate the substrate 552 to from hydrophobic structures, such as the hydrophobic structure 528. The higher temperature of the first roller 554 and lower temperature of the second roller 558 produces a temperature gradient in the nip 566. The rollers 554 and 558 apply the predetermined temperature and pressure to the substrate in a much more controlled manner than the prior art reflow ovens. Additionally, the rollers 554 and 558 rotate at a controlled velocity to enable each portion of the substrate 552 to remain in the nip 566 for a predetermined dwell time, which typically ranges from 0.1 second to 10 seconds in different operating configurations.

In FIG. 5, the apparatus 580 applies heat and pressure to enable the hydrophobic material 544 to penetrate into the substrate 552. The elevated temperature and pressure in the nip 106 melt the solidified hydrophobic material 544 and the liquefied hydrophobic material spreads both horizontally and vertically into the porous material in the substrate 552. The spreading distance L of the liquefied hydrophobic material is provided by Washburn's equation:

$$L = \sqrt{\frac{\gamma D t}{4\eta}}$$

where $\gamma$ is the surface tension of the melted hydrophobic material 544, D is the pore diameter of pores in the substrate 552, t is the dwell time of the substrate in the nip during which the temperature gradient and pressure in the nip reduce the viscosity of the hydrophobic material 544, and $\eta$ is the viscosity of the melted hydrophobic liquid. The surface tension $\gamma$ and viscosity $\eta$ terms are empirically determined from the properties of the hydrophobic material 544. The pore diameter D is empirically determined from the type of paper or other hydrophilic material that forms the substrate 552. The apparatus 580 has direct or indirect control over viscosity $\eta$ of the hydrophobic material and time t as the hydrophobic material and substrate move through the temperature gradient that is produced in the nip 566. Hydrophobic materials such as wax or phase-change inks transition into a liquid state with varying levels of viscosity based on the temperature of the material and pressure applied to the hydrophobic material. The viscosity of the liquefied hydrophobic material is inversely related to the temperature of the material. The temperature gradient in the nip reduces the viscosity of the hydrophobic material in the higher-temperature region near the side 560 and the first roller 554 to a greater degree than on the cooler side 556 and cooler roller 558. Thus, the temperature gradient enables the ink in the higher temperature regions of the temperature gradient to penetrate a longer distance compared to the ink in the cooler regions due to the reduced viscosity at increased temperature.

As is known in the art, the pressure applied in the nip 566 also reduces the effective melting temperature of the hydrophobic material 544 so that the temperature levels required to melt and reduce the viscosity level of the hydrophobic material 544 in the nip 566 are lower than the melting temperature at standard atmospheric pressure. Once a portion of the substrate 552 exits the nip 566, the pressure and temperature levels drops rapidly, which enables the hydrophobic material 544 to return to a solidified state in a more rapid and controlled manner than in the prior art reflow oven depicted in FIG. 12A. The dwell time of each portion of the substrate 552 in the nip 566 also affects the amount of time that the hydrophobic material 544 spends in the liquid state.

In the nip 566, the temperature gradient produces anisotropic heating of the melted hydrophobic material 544. The higher temperature of the first roller 554 on the side 560 reduces the viscosity $\eta$ of the hydrophobic material 544 to a greater degree than on the cooler side 556. Thus, the temperature gradient enables the hydrophobic material 544 to flow into the porous material of the substrate 552 toward the second side 560 for a longer distance than the horizontal flow of the hydrophobic material 544 along the length of the substrate 552. In FIG. 5, the longer arrow 520 depicts the longer distance of flow L for the hydrophobic material 544 through the porous material in the substrate 552 toward the high temperature side 560, while the shorter arrows 524 indicate a shorter flow distance along the length of the substrate 552. For a phase-change ink hydrophobic material, the reduced viscosity $\eta$ of the ink as the ink penetrates the substrate 552 towards the higher temperature roller 554 enables the phase-change ink to penetrate through the substrate from the printed surface 556 to the second side 560, which forms a layer of the phase-change ink through the entire thickness of the substrate 552.

Figure 12B:
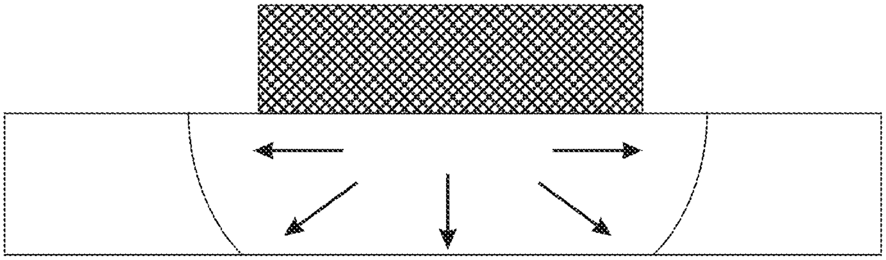
FIG. 12B PRIOR ART
FIG. 12B is a depiction of a penetration pattern with a high degree of lateral spread for hydrophobic material in the prior art reflow oven of FIG. 12A.

The apparatus 580 generates the anisotropic temperature gradient and liquid flow patterns for the hydrophobic material 544 to form fluid channel barriers and other structures with the hydrophobic material 544 that exhibit less spread along the length of the substrate 552 and improved penetration through the substrate 552 from the printed side 556 to the blank side 560 and produce hydrophobic structures with higher density and lower variance than the prior art devices. Furthermore, the anisotropic temperature gradient in the apparatus 180 enables the hydrophobic material 144 to penetrate into the substrate 152 to a greater degree than the prior art reflow oven with the isotropic temperature distribution depicted in FIG. 12B. The narrower width of the barriers enables the production of smaller devices with finer feature details, and also improves the effectiveness of the fluid channels that control the capillary diffusion of fluids through the substrate. While Washburn's equation and the temperature gradient are discussed in detail in FIG. 3, similar principles apply in the single-layer and multi-layer chemical assay device formation apparatuses that are described below.

Figure 6:
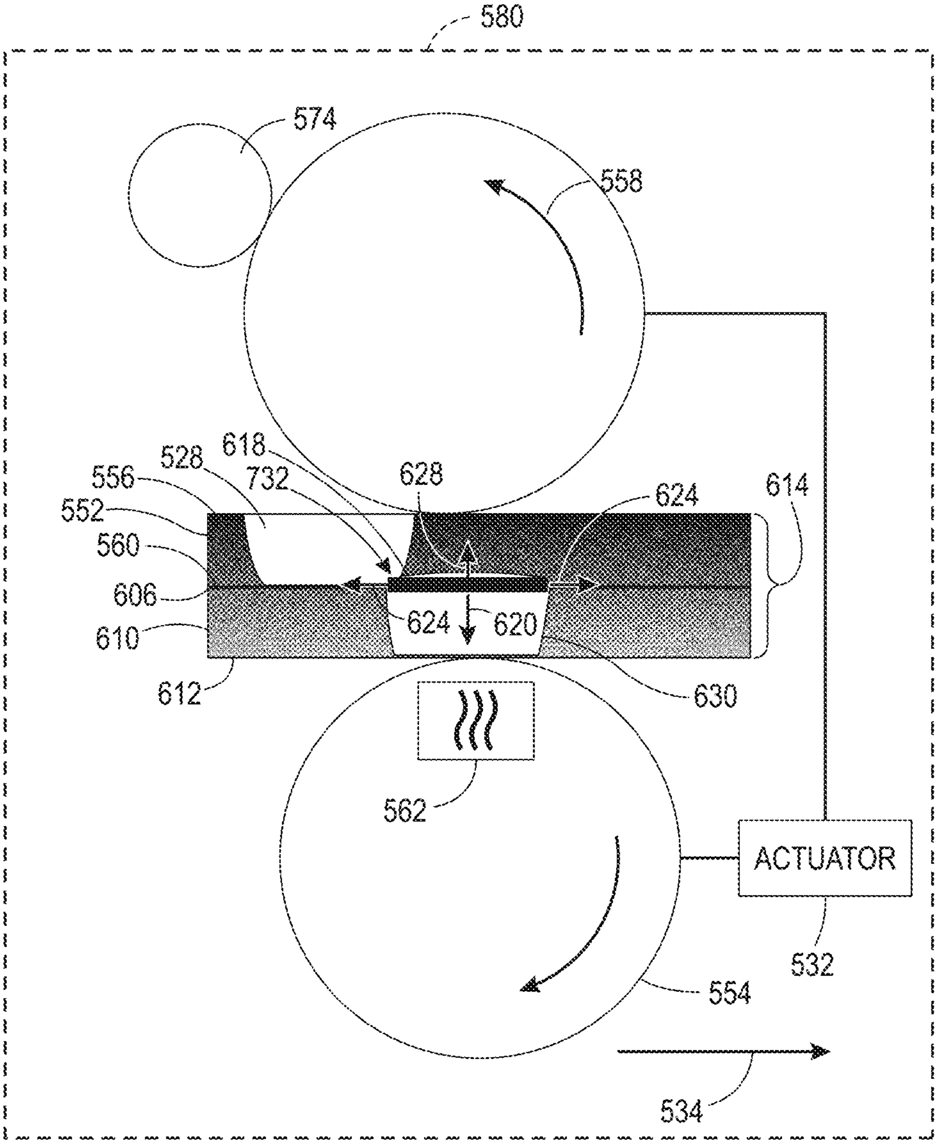
FIG. 6 is a schematic diagram of the apparatus of FIG. 5 in a configuration that bonds to hydrophilic substrates together using a hydrophobic material that forms hydrophobic structures in one or both of the substrates.

FIG. 6 depicts the apparatus 580 during the bonding process for two substrates 552 and 610 with the apparatus 580. In FIG. 6, the substrate 662 includes the hydrophobic structure 528 that is formed during the operation depicted in FIG. 5. During the bonding process in FIG. 6, the first side 656 of the substrate 552 engages the second roller 558 while the second side 560 engages a first side 606 of the second substrate 610 and a second layer of the hydrophobic material 618. A blank side 612 of the second substrate 610 engages the higher temperature first roller 554.

During operation, the first roller 554 and second roller 558 engage the stacked substrates 114 and 210 and move the stacked substrates in the process direction 534. The temperature and pressure in the nip between the rollers 554 and 558 melts the layer of hydrophobic material 618. The temperature gradient between the rollers 554 and 558 enables the hydrophobic material in the layer 618 to melt and penetrate the substrate 610. As depicted in FIG. 6, a larger portion of the melted hydrophobic material flows toward the higher-temperature first roller 554, as indicated by arrow 620, compared to lateral flow, as indicated by the arrows 624. The temperature gradient between the rollers 554 and 558 enables the melted hydrophobic material in the layer 618 to flow towards the higher temperature first roller 554 in a similar manner to the operation of apparatus 580 in FIG. 5.

The portion of the hydrophobic material in the layer 618 that penetrates the substrate 610 forms another hydrophobic structure 630, such as a fluid barrier or fluid channel wall. A smaller portion of the melted hydrophobic material in the layer 618 penetrates the substrate 552, as indicated by arrow 628, which bonds the two substrates 552 and 610 together. Some of the hydrophobic material remains between the substrates 552 and 610 to maintain the bond. A portion of the hydrophobic material 618 merges with the hydrophobic material in the barrier 528 in the region 632, which increases the strength of the bond between the substrates 552 and 610. The hydrophobic barrier 528 in the substrate 552 remains substantially intact during the fluid structure formation in the substrate 610 and bonding process between the substrates 552 and 610. In the illustrative example of FIG. 6, the apparatus 580 forms the bonded substrate 614 and the substrate transport moves the bonded substrates 614 in the process direction 534 at a predetermined velocity.

Figure 7:
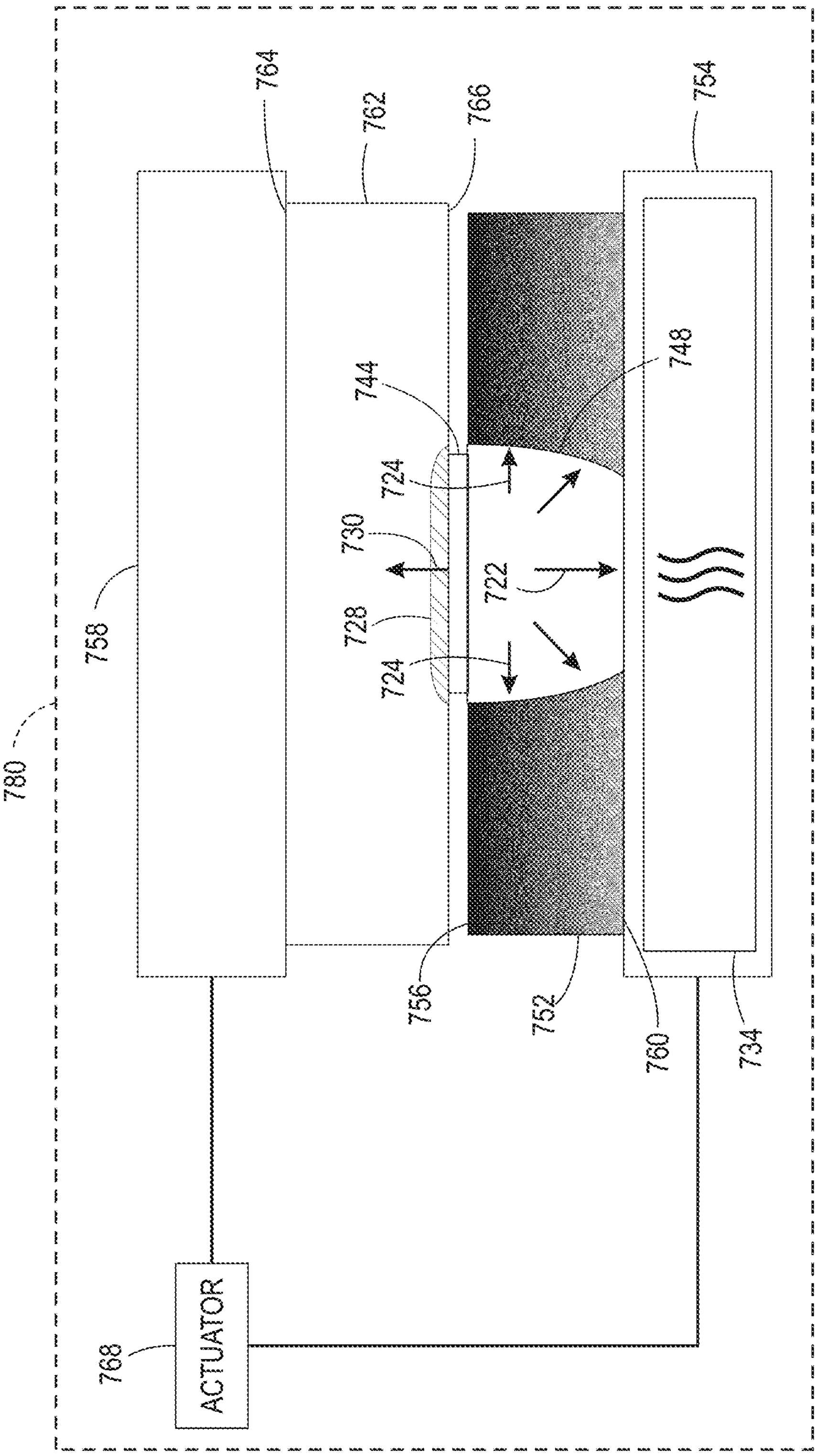
FIG. 7 is a schematic diagram of another apparatus that forms hydrophobic structures in a hydrophilic substrate and optionally bonds hydrophilic substrates together.

FIG. 7 depicts another configuration of an apparatus 780 that forms hydrophobic structures in a hydrophilic substrate for a chemical assay device and bonds multiple hydrophilic substrates together. The apparatus 780 includes two members 754 and 758, which are embodied as plates in the apparatus 780, which engage one or more hydrophilic substrates to apply a temperature gradient and pressure to form hydrophobic structures in the substrates and bond the substrates together. The apparatus 780 includes a heater 734 that is operatively connected to the first plate 754 to elevate the temperature of the first plate to a predetermined level (e.g. 70° C. to 140° C.) while the second plate 758 remains at a lower temperature. An actuator 768 is operatively connected to one or both of the plates 754 and 758 to move the plates together around one or more hydrophilic substrates to melt arrangements of hydrophobic material on the substrates to form hydrophobic structures that are similar to the structures depicted in the embodiments of FIG. 1, FIG. 4, and FIG. 11.

The actuator 768 moves the plates together to apply pressure in a range of 800 PSI to 3,000 PSI for a dwell time in a range of 0.1 seconds to 10 seconds. In the configuration of FIG. 7, the apparatus 780 forms hydrophobic structures in a single hydrophilic substrate and bonds the single hydrophilic substrate to a stack of one or more additional hydrophilic substrates in a single operation. The apparatus 780 optionally bonds successive hydrophilic substrates to the stack to form multi-layer devices in a "single substrate at a time" manner.

In FIG. 7, the apparatus 780 holds two substrates 752 and 762. The substrate 752 includes an arrangement of hydrophobic material 744 that is formed on a first side 756 and a second side 760 of the substrate 752 engages the first plate 754. The second substrate 762 includes a first side 762 that engages the second plate 752 and a second side 766 that engages the first side 756 and the arrangement of hydrophobic material 744 on the substrate 752. In one embodiment, the second substrate 762 is a sacrificial or "carrier" hydrophilic substrate that prevents contamination of the second plate 758 with the hydrophobic material in the arrangement 744. The carrier substrate 762 is subsequently removed from the substrate 752 that includes the hydrophobic structures by peeling or another mechanical separation process. In another embodiment, the second substrate 762 includes hydrophobic structures that have been formed previously in the apparatus 780 and the apparatus 780 bonds the additional substrate 752 to a stack of one or more substrates to form a multi-substrate chemical assay device. During formation of a multi-substrate device, the next substrate layer that is bonded to an existing stack of substrates engages the first plate 734 while the stack of existing substrates engage the second plate 758.

During operation of the apparatus 780, the actuator 768 moves the plates 754 and 758 together to engage the stacked substrates 752 and 756. As depicted in FIG. 7, the arrangement of hydrophobic material 744 melts in response to the heat and pressure in the apparatus 780. The temperature gradient between the plates 754 and 758 enables the hydrophobic material in the arrangement 744 to melt and penetrate the substrate 752. As depicted in FIG. 7, a larger portion of the melted hydrophobic material flows toward the higher-temperature first plate 754, as indicated by arrow 722, compared to lateral flow, as indicated by the arrows 724. The temperature gradient between the plates 754 and 758 enables the melted hydrophobic material in the arrangement 744 to flow towards the higher temperature first plate 754 in a similar manner to the apparatus 580 of FIG. 5 and FIG. 6.

The portion of the hydrophobic material in the layer 744 that penetrates the substrate 752 forms another hydrophobic structure 748, such as a fluid barrier or fluid channel wall. A smaller portion of the melted hydrophobic material in the layer 744 penetrates the substrate 762, which bonds the two substrates 752 and 762 together. In FIG. 7, the hydrophobic material 728 corresponds to a smaller portion of the hydrophobic material 744 that melts and penetrates the second substrate 762 as depicted by the arrow 730. Some of the hydrophobic material remains between the substrates 752 and 762 to maintain the bond.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A chemical assay device comprising:

a first hydrophilic substrate, the first hydrophilic substrate having a first side and a second side, a predetermined length and width, and a thickness of not more than 1 millimeter; and a first hydrophobic structure formed in the first hydrophilic substrate from a hydrophobic material, the first hydrophobic structure penetrating through substantially the thickness of the first hydrophilic substrate from the first side to the second side, the first hydrophobic structure forming a fluid barrier wall, the fluid barrier wall further comprising:

a first surface extending through the thickness of the first hydrophilic substrate with a deviation from perpendicular of less than 20° between the first side and the second side of the first hydrophilic substrate; and a second surface extending through the thickness of the first hydrophilic substrate with a deviation from perpendicular of less than 20° between the first side and the second side of the first hydrophilic substrate, the hydrophobic material in the fluid barrier wall occupying more than 50% of a predetermined void volume fraction within a region of the first hydrophilic substrate located between the first surface and the second surface of the fluid barrier wall.

2. The chemical assay device of claim 1 further comprising:

a second hydrophilic substrate having a first side and a second side, the first side of the second hydrophilic substrate engaging the second side of the first hydrophilic substrate, and the second hydrophilic substrate having another predetermined length, width, and a thickness of not more than 1 millimeter; and a second hydrophobic structure formed in the second hydrophilic substrate from the hydrophobic material and penetrating through substantially the thickness of the second hydrophilic substrate from the first side to the second side, the second hydrophobic structure forming another fluid barrier wall in the second hydrophilic substrate with a surface of the other fluid barrier wall extending through the thickness of the second hydrophilic substrate with a deviation from perpendicular of less than 20° between the first side and the second side of the second hydrophilic substrate.

3. The chemical assay device of claim 1 wherein the first hydrophobic structure substantially comprises hydrophobic material formed in a first arrangement of the hydrophobic material on the first side of the hydrophilic substrate formed prior to formation of the first hydrophobic structure and a spread factor corresponding to an increase in width from a first width of the first arrangement of the hydrophobic material to a second width of the hydrophobic structure does not exceed 3.0.

4. The chemical assay device of claim 1 wherein the first hydrophobic structure substantially comprises hydrophobic material in a first arrangement of the hydrophobic material on the first side of the hydrophilic substrate formed prior to formation of the first hydrophobic structure and a spread factor corresponding to an increase in width from a first width of the first arrangement of the hydrophobic material to a second width of the hydrophobic structure does not exceed 2.0.

5. The chemical assay device of claim 1 further comprising:

a second hydrophobic structure in the first hydrophilic substrate formed from the hydrophobic material and penetrating through substantially the thickness of the first hydrophilic substrate from the first side to the second side, the second hydrophobic structure forming another fluid barrier wall in the first hydrophilic substrate with a surface of the other fluid barrier wall extending through the thickness of the first hydrophilic substrate with a deviation from perpendicular of less than 20° between the first side and the second side of the first hydrophilic substrate the second hydrophobic structure in the first hydrophilic substrate being located at a distance of not more than 0.3 millimeters from the first hydrophobic structure along the length or width of the first hydrophilic substrate.

6. The chemical assay device of claim 5, the first hydrophobic structure and the second hydrophobic structure forming substantially parallel fluid barrier walls in the first hydrophilic substrate to enable a fluid to diffuse through a portion of the first hydrophilic substrate between the substantially parallel fluid barrier walls.

7. The chemical assay device of claim 1 wherein the first hydrophilic substrate substantially comprises filter paper.

8. The chemical assay device of claim 1 wherein the hydrophobic material substantially comprises wax.

9. The chemical assay device of claim 1 wherein the hydrophobic material substantially comprises a phase-change ink.

10. A chemical assay device comprising:

a first hydrophilic substrate, the first hydrophilic substrate having a first side and a second side, a predetermined length and width, and a thickness of not more than 1 millimeter;

a first hydrophobic structure formed in the first hydrophilic substrate from a hydrophobic material and penetrating through substantially the thickness of the first hydrophilic substrate from the first side to the second side, the hydrophobic material in the first hydrophobic structure occupying more than 50% of a predetermined void volume fraction of the hydrophilic substrate and the first hydrophobic structure forming a fluid barrier wall in the first hydrophilic substrate with a surface of the fluid barrier wall extending through the thickness of the first hydrophilic substrate with a deviation from perpendicular of less than 20° between the first side and the second side of the first hydrophilic substrate;

a second hydrophilic substrate having a first side and a second side, the first side of the second hydrophilic substrate engaging the second side of the first hydrophilic substrate, and the second hydrophilic substrate having another predetermined length, width, and thickness of not more than 1 millimeter; and a second hydrophobic structure formed in the second hydrophilic substrate and the first hydrophilic substrate to bond the first hydrophilic substrate and the second hydrophilic substrate together, the hydrophobic material in the second hydrophobic structure extending from a second arrangement of the hydrophobic material formed on only the first side of the second hydrophilic substrate and penetrating both the first hydrophilic substrate and the second hydrophilic substrate.

11. The chemical assay device of claim 10, the second hydrophobic structure penetrating through substantially the thickness of the second hydrophilic substrate from the first side to the second side, the second hydrophobic structure forming another fluid barrier wall in the second hydrophilic substrate with a surface of the other fluid barrier wall extending through the thickness of the second hydrophilic substrate with a deviation from perpendicular of less than 20° between the first side and the second side of the second hydrophilic substrate.

12. The chemical assay device of claim 10 wherein the second hydrophilic substrate substantially comprises filter paper.

* * * * *